US011823663B2

(12) United States Patent
Amarilio et al.

(10) Patent No.: US 11,823,663 B2
(45) Date of Patent: *Nov. 21, 2023

(54) AUDIO PROCESSING IN A LOW-BANDWIDTH NETWORKED SYSTEM

(71) Applicant: Google LLC, Mountain View, CA (US)

(72) Inventors: Tomer Amarilio, Palo Alto, CA (US); Jeremy Payne, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,773

(22) Filed: Mar. 21, 2022

(65) Prior Publication Data

US 2022/0215831 A1 Jul. 7, 2022

Related U.S. Application Data

(63) Continuation of application No. 16/076,165, filed as application No. PCT/US2018/044758 on Aug. 1, 2018, now Pat. No. 11,114,094.

(60) Provisional application No. 62/692,181, filed on Jun. 29, 2018.

(51) Int. Cl.
| | |
|---|---|
| *G10L 15/22* | (2006.01) |
| *G10L 15/08* | (2006.01) |
| *G10L 15/30* | (2013.01) |
| *G10L 15/32* | (2013.01) |
| *G10L 15/00* | (2013.01) |

(Continued)

(52) U.S. Cl.
CPC .............. *G10L 15/08* (2013.01); *G10L 15/22* (2013.01); *G10L 15/30* (2013.01); *G10L 15/32* (2013.01); *G10L 15/00* (2013.01); *G10L 15/20* (2013.01); *G10L 19/00* (2013.01); *G10L 2015/088* (2013.01); *G10L 2015/223* (2013.01)

(58) Field of Classification Search
CPC ...................................... G10L 15/22
See application file for complete search history.

(56) References Cited

U.S. PATENT DOCUMENTS

| | | | |
|---|---|---|---|
| 8,533,815 B1 * | 9/2013 | Upson | H04L 9/3228 |
| | | | 713/168 |
| 9,368,105 B1 * | 6/2016 | Freed | G10L 15/22 |
| 2007/0198269 A1 | 8/2007 | Braho et al. | |

(Continued)

OTHER PUBLICATIONS

Blue, et al. "2MA: Verifying Voice Commands via Two Microphone Authentication," ASIACCS'18, 2018—see Non-Final attachment. (Year: 2018).*

(Continued)

*Primary Examiner* — Feng-Tzer Tzeng
(74) *Attorney, Agent, or Firm* — Dority & Manning, P.A.

(57) ABSTRACT

The present disclosure is generally directed a system to detect activation phrases within input audio signals transmitted over a low-bandwidth network. The system can use a two-stage activation phrase detection process. First a sensing device, which can include a plurality of microphones for detecting an input audio signal, can detect an input audio signal that includes a candidate activation phrase. Second, the sensing device can transmit the recordings of the input audio signal to a client device for confirmation that the input audio signal includes the activation phrase.

21 Claims, 4 Drawing Sheets

(51) Int. Cl.
    *G10L 19/00*     (2013.01)
    *G10L 15/20*     (2006.01)

(56) References Cited

U.S. PATENT DOCUMENTS

| | | |
|---|---|---|
| 2009/0313016 A1 | 12/2009 | Cevik et al. |
| 2014/0195247 A1 | 7/2014 | Parkinson et al. |
| 2016/0064002 A1* | 3/2016 | Kim .................. G01S 3/8083 |
| | | 704/246 |
| 2017/0069324 A1* | 3/2017 | Gardner .................. G10L 15/22 |

OTHER PUBLICATIONS

Blue, et al., "2MA: Verifying Voice Commands via Two Microphone Authentication," ASIACCS'18, 2018. (Year: 2018).*

European Patent Office Communication Issue in Application Ser. No. 201838489, dated Oct. 9, 2020, 8 pages.

European Patent Office Intention to Grant for European Application No. 18759782.8, dated Feb. 18, 2020, 7 pages.

International Preliminary Report on Patentability for Application No. PCT/US2018/044758, dated Dec. 29, 2020, 9 pages.

International Search Report and Written Opinion for PCT/US2018/044758 dated Dec. 5, 2018, 11 pages.

Luthra., "Amazon Alexa Mobile Accessories: A New Alexa-Enabled Product Category with Dev Tools Coming Soon", Alexa Blogs, Jan. 5, 2018, retrieved Apr. 30, 2018, from URL: https://developer.amazon.com/blogs/alexa/post/564685cf-0b1b-4fe4-824e-2ce1e88e3e78/amazon-alexa-mobile-accessories-a-new-alexa-enabled-product-category-with-dev-tools-coming-soon, 5 pages.

* cited by examiner

AUDIO PROCESSING IN A LOW-BANDWIDTH NETWORKED SYSTEM

CROSS-REFERENCE TO RELATED APPLICATIONS

This application claims priority under 35 U.S.C. § 120 as a continuation application of U.S. patent application Ser. No. 16/076,165, titled "AUDIO PROCESSING IN A LOW-BANDWIDTH NETWORKED SYSTEM," filed Aug. 7, 2018, which is a U.S. National Stage Application under 35 U.S.C. § 371 of International Patent Application No. PCT/US2018/044758, titled "AUDIO PROCESSING IN A LOW-BANDWIDTH NETWORKED SYSTEM," designating the United States and filed Aug. 1, 2018, which claims priority to U.S. Provisional Patent Application No. 62/692,181 filed on Jun. 29, 2018 and titled "AUDIO PROCESSING IN A LOW-BANDWIDTH NETWORKED SYSTEM," each of which is herein incorporated by reference in its entirety.

BACKGROUND

Networked devices can process audio-based signals. The devices' ability to process the audio-based signals can be based on the quality of the audio-based signals. High-quality audio-based signals can have relatively large file sizes. Excessive network transmissions, packet-based or otherwise, of network traffic data between computing devices can prevent a computing device from properly processing the audio-based signals, completing an operation related to the audio-based signals, or responding timely to the audio-based signals.

SUMMARY

According to at least one aspect of the disclosure, a system to detect activation phrases in remote device can include a natural language processor component executed by a first client device. The system can receive a first instance of first input audio signal detected by a sensing device. The system can parse the first instance of the first input audio signal to identify a first candidate activation phrase in the first instance of the first input audio signal. The system can determine that the first candidate activation phrase does not contain a predetermined activation phrase. The system can receive a second instance of the first input audio signal obtained by the sensing device. The system can parse the second instance of the first input audio signal to identify a second candidate activation phrase in the second instance of the first input audio signal. The system can determine that the second candidate activation phrase contains the predetermined activation phrase. The system can include an interface to transmit, based on a determination that the second candidate activation phrase contains the predetermined activation phrase, an audio signal associated with at least one of the first instance of the first input audio signal and the second instance of the first input audio signal. The data processing system can include a second natural language processor component to identify a request in the at least one of the first instance of the first input audio signal and the second instance of the first input audio signal.

According to at least one aspect of the disclosure a system to transmit data in a voice-activated network can include a client device, to receive a first instance of a first input audio signal. The system can include the client device to receive a second instance of the first input audio signal. The system can include a natural language processor component executed by the client device, to parse the first instance of the first input audio signal to identify an activation phrase. The system can include an interface, of the client device, to transmit, at a first time point, the first instance of the first input audio signal to a data processing system based on identification of the activation phrase in the first instance of the first input audio signal. The data processing system can include a second natural language processor component. The interface, of the client device, can transmit, at a second time point after the first time point, the second instance of the first input audio signal to the data processing system. The interface, of the client device, can transmit an audio signal associated with at least one of the first instance of the first input audio signal and the second instance of the first input audio signal to the data processing system based on a confirmation message from the data processing system of an identification of the activation phrase in the second instance of the first input audio signal.

According to at least one aspect of the disclosure, a method to transmit data in a voice-activated network can include receiving, by a client device, a first instance of a first input audio signal. The method can include obtaining, by the client device, a second instance of the first input audio signal. The method can include parsing, by a natural language processor component executed by the client device, the first instance of the first input audio signal to identify an activation phrase. The method can include transmitting, by an interface of the client device at a first time point, the first instance of the first input audio signal to a data processing system based on identification of the activation phrase in the first instance of the first input audio signal. The data processing system can include a second natural language processor component. The method can include transmitting, by the interface of the client device at a second time point after the first time point, the second instance of the first input audio signal to the data processing system. The method can include transmitting, by the interface of the client device, an audio signal associated with at least one of the first instance of the first input audio signal and the second instance of the first input audio signal to the data processing system based on a confirmation message from the data processing system of an identification of the activation phrase in the second instance of the first input audio signal.

According to at least one aspect of the disclosure, a system to detect activation phrases in a remote device can include a natural language processor component executed by a first client device. The system can receive a first instance of first input audio signal detected by a first microphone of a sensing device. The system can parse the first instance of the first input audio signal to identify a first candidate activation phrase in the first instance of the first input audio signal. The system can determine that the first candidate activation phrase does not contain a predetermined activation phrase. The system can receive a second instance of the first input audio signal detected by a second microphone of the sensing device. The system can parse the second instance of the first input audio signal to identify a second candidate activation phrase in the second instance of the first input audio signal. The system can determine that the second candidate activation phrase contains the predetermined activation phrase. The system can include an interface to transmit, based on a determination that the second candidate activation phrase contains the predetermined activation phrase, at least one of the first instance of the first input audio signal and the second instance of the first input audio signal to a data processing system. The data processing system can include a second natural language processor component to identify a request in the at least one of the first instance of the first input audio signal and the second instance of the first input audio signal.

According to at least one aspect of the disclosure, a system to transmit data in a voice-activated network can include a first microphone of a client device, to receive a first instance of a first input audio signal and a first instance of a second input audio signal. The system can include a second microphone of the client device, to receive a second instance of the first input audio signal and a second instance of the second input audio signal. The system can include a natural language processor component executed by the client device to parse the first instance of the first input audio signal to identify an activation phrase. The system can include an interface, of the client device, to transmit, at a first time point, the first instance of the first input audio signal to a data processing system based on identification of the activation phrase in the first instance of the first input audio signal. The data processing system can include a second natural language processor component. The interface, of the client device, can transmit, at a second time point after the first time point, the second instance of the first input audio signal to the data processing system. The interface, of the client device, can transmit the first instance of the second input audio signal to the data processing system based on a confirmation message from the data processing system of an identification of the activation phrase in the second instance of the first input audio signal.

According to at least one aspect of the disclosure, a method to transmit data in a voice-activated network can include receiving, by a first microphone of a client device, a first instance of a first input audio signal and a first instance of a second input audio signal. The method can include receiving, by a second microphone of the client device, a second instance of the first input audio signal and a second instance of the second input audio signal. The method can include parsing, by a natural language processor component executed by the client device, the first instance of the first input audio signal to identify an activation phrase. The method can include transmitting, by an interface of the client device at a first time point, the first instance of the first input audio signal to a data processing system based on identification of the activation phrase in the first instance of the first input audio signal. The data processing system can include a second natural language processor component. The method can include transmitting, by the interface of the client device at a second time point after the first time point, the second instance of the first input audio signal to the data processing system. The method can include transmitting, by the interface of the client device, the first instance of the second input audio signal to the data processing system based on a confirmation message from the data processing system of an identification of the activation phrase in the second instance of the first input audio signal.

Each aspect may optionally include one or more of the following features. The system may include first and second microphones. The first instance of the first input audio signal may be detected by a first microphone and the second instance of the first input audio signal may be detected by a second microphone. A first instance of a second input audio signal may be received and a second instance of the second input audio signal may be received. The audio signal associated with at least one of the first instance of the first input audio signal and the second instance of the first input audio signal may be at least one of the first instance of the second input audio signal and the second instance of the second input audio signal. Alternatively, the audio signal associated with the at least one of the first instance of the first input audio signal and the second instance of the first input audio signal may be at least one of the first instance of the first input audio signal and the second instance of the first input audio signal or a portion thereof.

The interface may transmit, from the first client device to the sensing device, a request for the second instance of the first input audio signal based on a determination that the first candidate activation phrase does not contain the predetermined activation phrase. The natural language processor component may: receive a first instance of a second input audio signal detected by the first microphone of the sensing device; parse the first instance of the second input audio signal to identify a third candidate activation phrase; determine that the third candidate activation phrase contains the predetermined activation phrase; and the interface may transmit, to the sensing device, a request for a third input audio signal based on a determination that the third candidate activation phrase contains the predetermined activation phrase. The natural language processor component may: receive a first instance of a second input audio signal detected by the first microphone of the sensing device; parse the first instance of the second input audio signal to identify a third candidate activation phrase; determine that the third candidate activation phrase contains the predetermined activation phrase; and the interface may terminate a reception of a second instance of the second input audio signal based on a determination that the third candidate activation phrase contains the predetermined activation phrase. The interface may establish a Bluetooth connection between the first client device and the sensing device. The natural language processor component may: receive a third instance of the first input audio signal from a sensor of the first client device; parse the third instance of the first input audio signal to identify a third candidate activation phrase in the third instance of the first input audio signal; and determine that the first input audio signal contains the predetermined activation phrase based at least on the third candidate activation phrase and the second candidate activation phrase. The natural language processor component may: receive a first instance of second input audio signal detected by a first microphone of a second sensing device; parse the first instance of the second input audio signal to identify a third candidate activation phrase in the first instance of the second input audio signal; determine that the third candidate activation phrase does not contain a predetermined activation phrase; receive a second instance of the second input audio signal detected by the first microphone of the second sensing device, the second instance of the second input audio signal having a lower compression rate than the first instance of second input audio signal; parse the second instance of the second input audio signal to identify a fourth candidate activation phrase in the second instance of the second input audio signal; determine that the fourth candidate activation phrase contains the predetermined activation phrase; and the interface of the first client device may: transmit, based on a determination that the fourth candidate activation phrase contains the predetermined activation phrase, at least one of the first instance of the second input audio signal and the second instance of the second input audio signal to the data processing system comprising the second natural language processor component to identify a second request in the at least one of the first instance of the second input audio signal and the second instance of the second input audio signal.

The interface may: transmit, at a first time point, the first instance of the first input audio signal to the client device at a first compression level; and transmit, at a second time point, the second instance of the first input audio signal to the client device at a second compression level lower than the first compression level. The interface may transmit, at the first time point, the second instance of the first input audio signal to the client device at a first compression level; and transmit, at the second time point, the first instance of the first input audio signal and the second instance of the input audio signal to the client device at a second compression level lower than the first compression level. The interface may: transmit, at the second time point, the second instance of the first input audio signal to the client device based on a confirmation message that the activation phrase is not in the first instance of the input audio signal. The interface may: transmit, at the second time point, the second instance of the first input audio signal to the client device prior to receipt of a confirmation message that the activation phrase is not in the first instance of the input audio signal. The interface may terminate the transmission of the second interface of the first input audio signal based on a confirmation message that the activation phrase is in the first instance of the input audio signal. The interface may: establish a Bluetooth connection with the client device; transmit, over the Bluetooth connection, the first instance of the first input audio signal and the second instance of the first input audio signal.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for multi-modal transmission of packetized data in a voice activated data packet-based computer network environment. The various concepts introduced above and discussed in greater detail below may be implemented in any of numerous ways.

The present disclosure is generally directed to a system to detect activation phrases within input audio signals transmitted over a low-bandwidth network. For example, one or more devices of the system can be communicatively coupled together via a Bluetooth connection. The system can use a two-stage activation phrase detection process. First, a sensing device, which can include a plurality of microphones for detecting an input audio signal, can detect an input audio signal with a candidate activation phrase. The sensing device's language processing can be imprecise and trigger false positives when determining whether an input audio signal includes an activation phrase. Second, the sensing device can transmit the recordings of the input audio signal to a client device for confirmation that the input audio signal includes the activation phrase. Because of the limited bandwidth of the link between the sensing device and the client device transmitting both of the recordings made by the sensing device at the same time can introduce delay as the data transfer is completed.

To reduce the delay of receiving a confirmation from the client device, the sensing device can transfer a first recording of the input audio signal to the client device. If the client device determines the activation phrase is present in the first recording, the other recordings made by the sensing device can be discarded and not transmitted to the client device, thereby saving bandwidth. If the client device cannot identify the activation phrase in the first recording, the client device can receive a second recording from the sensing device. The client device can then process the second recording to confirm whether the input audio signal includes the activation phrase. The client device may therefore provide improved detection of an activation phrase using recordings made by a sensing device, without introducing latency due to additional information being transmitted between the sensing device and the client device.

Figure 1:
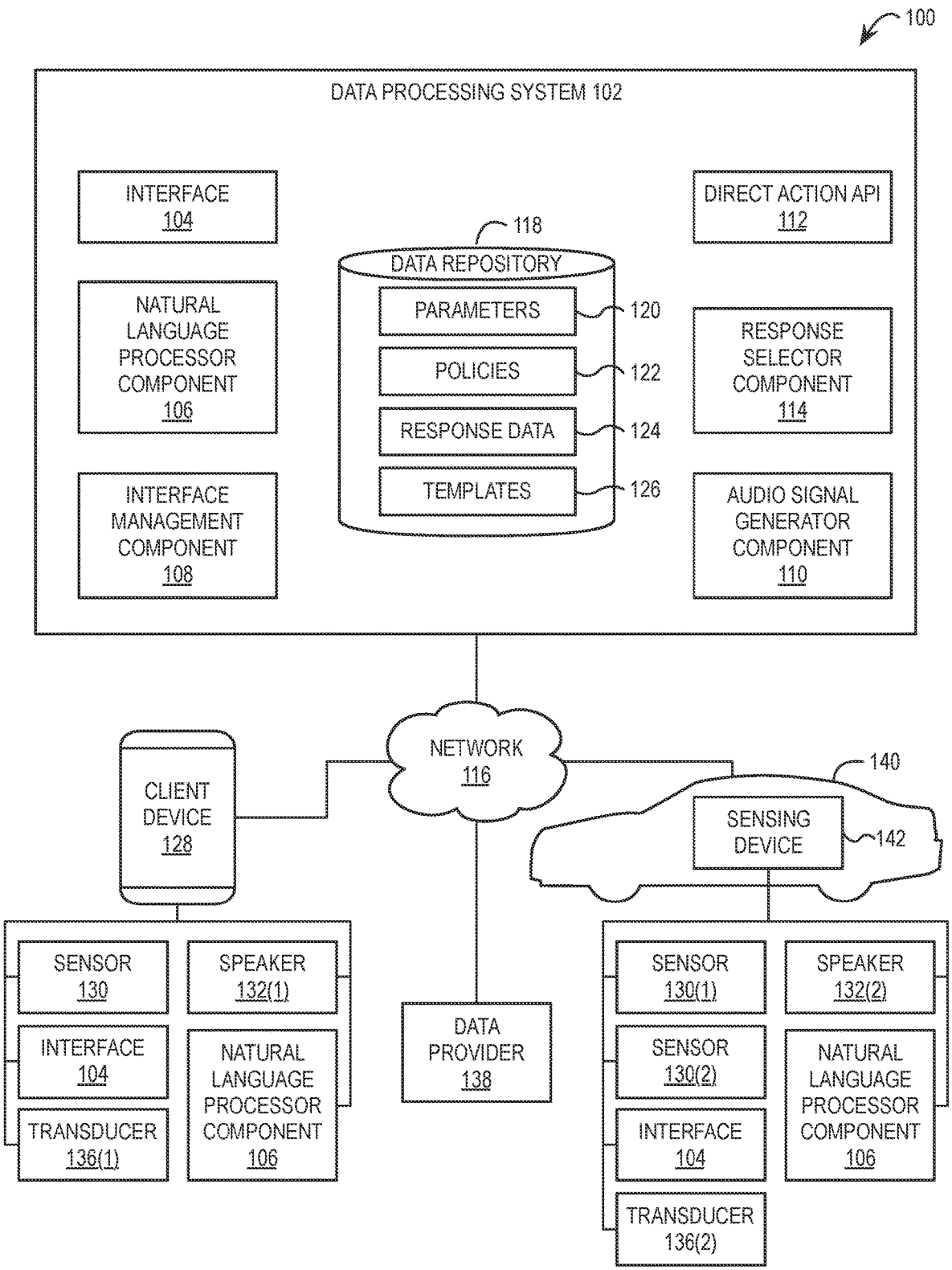
FIG. 1 illustrates an example system to detect activation phrases in input audio signals transmitted in a low bandwidth network.

FIG. 1 illustrates an example system 100 to detect activation phrases in input audio signals transmitted in a low bandwidth network. The system 100 can include at least one data processing system 102, one or more client devices 128, and one or more sensing devices 142 that can be located in a vehicle 140, such as a car. The sensing devices 142 can be referred to as remote devices because the sensing devices 142 can be placed remote to the client devices 128 for the purpose of detecting input audio signals and transmitting the input audio signals to the client devices 128.

The data processing system 102 can include an interface 104. The data processing system 102 can include a natural language processor (NLP) component 106 to parse audio-based inputs, such as input audio signals. The data processing system 102 can include an interface management component 108 to detect and manage the interfaces of other devices in the system 100. The data processing system 102 can include an audio signal generator component 110 to generate audio-based signals. The data processing system 102 can include a direct action application programming interface (API) 112. The data processing system 102 can include a response selector component 114 to select responses to audio-based input signals. The data processing system 102 can include a data repository 118 in which the data processing system 102 can store parameters 120, policies 122, response data 124, and templates 126. The client device 128 and the sensing device 142 can include and execute instances of the components of the data processing system 102. In some implementations, the client device 128 and the sensing device 142 can each include an instance of the data processing system 102 or any components thereof.

The system 100 can also include one or more client devices 128. The client devices 128 can include sensors 130, speakers 132(1), interfaces 134, and transducers 136(1). The client devices 128 can execute an instance of the NLP component 106. The system 100 can also include one or more data providers 138. The system 100 can include one or more vehicles 140. Each of the vehicles 140 can include one or more sensing devices 142. The sensing devices 142 can include a first sensor 130(1), a second sensor 130(2) (which can generally be referred to as sensors 130), speakers 132(2), interfaces 134, and transducers 136(2). The sensing devices 142 can each execute an instance of the NLP component 106. The client device's speakers 132(1) and the sensing device's speakers 132(2) can be the same type of speaker or different types of speakers. The client device's speakers 132(1) and the sensing device's speakers 132(2) can generally be referred to as speakers 132. The client device's transducer 136(1) and the sensing device's transducer 136(2) can be the same type of transducer or different types of transducers. The client device's transducer 136(1) and the sensing device's transducer 136(2) can generally be referred to as transducers 136.

The components of the system 100 can communicate over a network 116. One or more of the client devices 128 can be located within an instance of the vehicle 140. For example, the client device 128 can be the mobile phone of a driver driving the vehicle 140. One or more of the client devices 128 can be remote to the vehicle 140. For example, after the driver parks and exits the vehicle 140 for work, the driver's mobile phone is remote to the vehicle 140. When within a predetermined proximity of the vehicle 140, the interface 104 of the client device 128 can establish a connection with the sensing device 142 within the vehicle 140 via Bluetooth. For example, the portion of the network 116 between the client device 128 and the sensing device 142 can be a Bluetooth connection.

The network 116 can include computer networks such as the internet, local, wide, metro or other area networks, intranets, satellite networks, other computer networks such as voice or data mobile phone communication networks, and combinations thereof. The network 116 can be used by the data processing system 102, client devices 128, and sensing devices 142 to access information resources such as web pages, web sites, domain names, uniform resource locators, of data providers 138. For example, the data processing system 102 can, via the network 116, access a data provider 138 that provides weather data for specific locations, such as a location associated with a vehicle 140.

The network 116 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 116 can include a wireless link, such as a Bluetooth link, an infrared channel, or satellite band. The topology of the network 116 may include a bus, star, or ring network topology. The network 116 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client devices 128 and the sensing devices 142 can each include at least one logic device such as a computing device having a processor to communicate with each other and with the data processing system 102 via the network 116. The sensing device 142 can communicate with the data processing system 102 via the client device 128. For example, sensing device 142 can transmit an input audio signal to the client device 128 via a Bluetooth connection and the client device 128 can transmit the input audio signal to the data processing system 102.

The client devices 128 and the sensing devices 142 can include an instance of the any of the components described in relation to the data processing system 102, such as the NLP component 106. The client devices 128 and the sensing devices 142 can include an instance of the data processing system 102.

The client devices 128 can include a desktop computer, laptop, tablet computer, personal digital assistant, smartphone, mobile device, portable computer, thin client computer, virtual server, speaker-based digital assistant, or other computing device. The client device 128 can be the mobile phone of a user. An instance of a digital assistant executed by the client device 128 can receive input audio signals from the user. The input audio signal can include a voice-based or audio-based request. For example, the user can generate the utterance "Ok, play the next song." The client device 128 can detect the input audio signal and transmit the input audio signal to the data processing system 102, which can generate a response or action based on the request within the input audio signal.

The sensing device 142 can be a remote sensing device. The sensing device 142 can be remote to the client device 128, but within a predetermined distance of the client device 128. The predetermined distance can be the distance over which a Bluetooth connection between the client device 128 and the sensing device 142 can be established. The sensing device 142 can include one or more sensors 130 for the detection of input audio signal generated by the user. The sensing device 142 can transmit instances of the input audio signal captured by the sensing device's sensors 130 to the client device 128 for processing. The sensing device's sensors 130 can detect input audio signal in circumstances when the client device's sensors 130 cannot detect input audio signals. For example, the sensing device 142 can be positioned within an open area and can detect an input audio signal when the client device 128 is, for example, in the pocket of the user and cannot detect the input audio signal.

As illustrated in FIG. 1, the sensing device 142 can be configured as a vehicle accessory. For example, the sensing device 142 can be a Bluetooth enabled charging device. The sensing device 142 can be a power adapter that adapts the output of the vehicle's cigarette lighter to one or more USB ports. For example, the sensing device 142 can convert the 12 V or 24 V of the vehicle's cigarette lighter to 5 V and 1 A or 5 V and 2.1 A. The sensing device 142 can generate other output voltages and currents, such as voltages between about 5 V and about 10 V. The sensing device 142 can include one or more processors that can execute an instance of the data processing system 102 or any component thereof. The sensing device 142 can be removable from the vehicle 140. For example, the sensing device 142 can be a removable power adapter that can be plugged into and then removed from the vehicle's cigarette lighter. The sensing device 142 can be a permanent component of the vehicle 140. For example, the sensing device 142 can be a component of the vehicle's head unit. The vehicle 140 can be a car, truck, motorcycle, or other transportation device.

The sensing device 142 can be configured as a remote sensing device for use in non-vehicular environments. For example, the sensing device 142 can be a sensor array that can include a plurality of sensors 130. The sensor array can be positioned in a room of the user's home to capture input audio signals and transmit the input audio signals to, for example, a speaker-based digital assistant that is located in a different room of the user's home.

The client device 128 and the sensing device 142 can include at least one sensor 130, at least one transducer 136, at least one audio driver, and at least one speaker 132. The sensor 130 can include a microphone or audio input sensor. The sensor 130 can also include one or more of a GPS sensor, proximity sensor, ambient light sensor, temperature sensor, motion sensor, accelerometer, or gyroscope. The transducer 136 can convert the audio input into an electronic signal. The audio driver can include a script or program executed by one or more processors of the client device 128 or the sensing device 142 to control the speaker 132. The speaker 132 can render audio signals by converting electrical signals into audible waves.

The client device 128 and the sensing device 142 can be associated with an end user that enters voice queries as input audio signal into the client device 128 or the sensing device 142. The user can register the sensing device 142 with the user's client device 128 by, for example, completing a Bluetooth pairing process to pair the sensing device 142 with the client device 128. The user can enter the voice queries to the client device 128 via the sensing device 142. In response to the input audio signal, the user can receive audio output in the form of a computer-generated voice from the client device 128 or sensing device 142. The audio output can be generated by the data processing system 102. In response to the input audio signals, the client device 128 can also receive action data structures to perform predetermined functions or actions. The interface 134 can receive or provide data messages to the direct action API 112 of the data processing system 102 and enable communication between the components of the system 100. The client device 128 can also include a user interface that enables a user to interact with the components of the system 100.

The sensing device 142 can transmit one or more instances of the input audio signal to the client device 128. The client device 128 can forward the input audio signal to the data processing system 102, which can fulfill the request that the data processing system's NLP component 106 parses from the input audio signal. To conserve bandwidth and power consumption of the sensing device 142 and the client device 128, the sensing device 142 can transmit the input audio signals to the client device 128 only when the sensing device 142 determines that the input audio signal includes an activation phrase. The activation phrase can be a phrase, term, wake word, or hot word that the user includes at the start of requests to indicate to the client device 128 or sensing device 142 that the input audio signal is directed to the client device 128 or the sensing device 142. For example, in the input audio signal "Ok device, change the song" the phrase "Ok device" can be the activation phrase.

The sensing device 142 can include a first sensor 130(1) and a second sensor 130(2). When a user generates an input audio signal that includes a voice query or request, the first sensor 130(1) can detect and record the voice query or request as a first instance of an input audio signal and the second sensor 130(2) can detect and record the voice query or request as a second instance of the input audio signal.

The sensing device 142 can include an instance of the NLP component 106 that can parse input audio signals received by the first sensor 130(1) and the second sensor 130(2). The NLP component 106 of the sensing device 142 can be an optimized instance of an NLP component 106 configured to run on a device, such as the sensing device 142, with lower amounts of computational resources. For example, rather than being able to parse any word in an input audio signal, the sensing device's instance of the NLP component 106 can be configured to detect a limited number of words, such as the activation phrase. If the sensing device's NLP component 106 determines that an instance of the input audio signal detected by one of the sensors 130 includes the activation phrase, the sensing device 142 can transmit at least one of the instances of the input audio signal to the client device 128. The client device 128 can have greater computational power when compared to the sensing device 142. The client device's NLP component 106 can parse the input audio signals to confirm whether the input audio signal includes the activation phrase. If the input audio signal includes the activation phrase, the client device 128 can transmit the input audio signal to the data processing system 102 for parsing and fulfillment by the data processing system 102.

The client device 128 can establish a low-bandwidth connection with the sensing device 142 to receive the instances of the input audio signal detected by the sensing device 142. The low-bandwidth connection can be a Bluetooth connection. Transmitting the first and second instances of the input audio signal detected by the sensor 130(1) and the sensor 130(2) can take several seconds (because of the low-bandwidth connection), which can result in a delay in confirming whether the input audio signal includes the activation phrase. To more quickly confirm, by the client device 128, whether the input audio signal includes the activation phrase, and to account for the low-bandwidth connection, the sensing device 142 can transmit the instances of the input audio signal to the client device 128 in series or at different compression levels.

For example, and responsive to determining, by the sensing device 142, that the input audio signal includes the activation phrase, the sensing device 142 can transmit one of the detected instances of the input audio signal to the client device 128. The sensing device 142 can transmit the second instance of the input audio signal to the client device 128 after the transmission of the first instance of the input audio signal to the client device 128 is complete. For example, the sensing device 142 can transmit the instances of the input audio signal to the client device 128 in series. Responsive to receiving the first instance of the input audio signal by the client device 128, the client device's NLP component 106 can begin to process the first instance of the input audio signal to confirm whether the input audio signal includes the activation phrase. As client device's NLP component 106 processes the first instance of the input audio signal, the client device 128 can receive the second instance of the input audio signal. If the NLP component 106 confirms the presence of the activation phrase in the first instance of the input audio signal, the client device 128 may not process the second instance of the input audio signal. If the NLP component 106 cannot confirm the presence of the activation phrase in the first instance of the input audio signal, the client device 128 can process the second instance of the input audio signal by its NLP component 106 to determine whether the second instance of the input audio signal includes the input audio signal.

Responsive to determining, by the sensing device 142, that the input audio signal includes the activation phrase, the sensing device 142 can transmit both instances of the input audio signal to the client device 128 at a low quality level or in a relatively highly compressed state. Once the low quality versions of the first and second instances of the input audio signal are transmitted to the client device 128, the sensing device 142 can transmit a higher quality (e.g., less compressed) version of the first and/or second instance of the input audio signal to the client device 128. If the client device 128 determines that one or more instances of the input audio signal includes the activation phrase, the client device 128 can transmit the input audio signal or the request therein to the data processing system 102 for fulfillment by the data processing system 102.

The system's data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can be audio-based or text-based. For example, the response date can include one or more audio files that when rendered provide an audio output or acoustic wave. The data within the response data can also be referred to as content items. The response data can include other content (e.g., text, video, or image content) in addition to audio content.

The data processing system 102 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous: one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high performance storage systems on localized high performance networks. Centralization of all or some of the data processing system 102 components, including servers and storage systems, and coupling them with advanced system management tools, allows more efficient use of server resources, which saves power and processing requirements and reduces bandwidth usage. Each of the components of the data processing system 102 can each include at least one processing unit, server, virtual server, circuit, engine, agent, appliance, or other logic device such as programmable logic arrays configured to communicate with the data repository 118 and with other computing devices.

The data processing system 102 can include the data repository 118. The data repository 118 can include one or more local or distributed databases and can include a database management system. The data repository 118 can include computer data storage or memory and can store one or more parameters 120, one or more policies 122, response data 124, and templates 126, among other data. The parameters 120, policies 122, and templates 126 can include information such as rules about a voice based session between the client device 128, data processing system 102, and sensing device 142. The response data 124 can include content items for audio output or associated metadata, as well as input audio messages that can be part of one or more communication sessions with the client device 128.

The applications, scripts, programs, or other components that are associated with the data processing system 102 can be installed at the client device 128 or the sensing device 142. The application can enable the client device 128 or the sensing device 142 to communicate input audio signals (and other data) to the interface 104 of the data processing system 102. The application can enable the client device 128 and the sensing device 142 to drive components of the client device 128 and the sensing device 142 to render the output audio signals.

The data processing system's NLP component 106 can receive input audio signals. The data processing system 102 can receive the input audio signal from the client device 128 or the sensing device 142. The data processing system 102 can receive an input audio signal from the sensing device 142 via the client device 128. A first device can execute the NLP component 106 and the NLP component 106 can receive the input audio signal from a second device. For example, the sensing device 142 can receive and transmit an input audio signal to the NLP component 106 of the client device 128.

The NLP component 106 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 106 can match the text to words that are associated (e.g., via a learning phase) with actions or output audio signals.

From the input audio signal, the NLP component 106 can identify at least one request or at least one trigger keyword corresponding to the request. The request can indicate intent or subject matter of the input audio signal. The trigger keyword can indicate a type of action likely to be taken. For example, the NLP component 106 can parse the input audio signal to identify at least one request to open the vehicle's windows or skip to a next audio file in a music playlist. The trigger keyword can include at least one word, phrase, root or partial word, or derivative indicating an action to be taken. The input audio signal can include an activation phrase or term, such as "go" or "ok."

The response selector component 114 can obtain information from the data repository 118, where it can be stored as part of the response data 124. The response selector component 114 can query the data repository 118 to select or otherwise identify response phrases or content item, for example, from the response data 124.

The audio signal generator component 130 can generate or otherwise obtain an output signal that includes the content item. The data processing system 102 can execute the audio signal generator component 110 to generate or create an output signal corresponding to the content item or request. For example, once a request is fulfilled, the signal generator component 110 can generate an audio output signal that includes the phrase "The action was completed."

The interface 104 can be a data interface, hardware interface, software interface, or a network interface that enable the components of the system 100 to communicate with one another. The interface 104 of the data processing system 102 can provide or transmit one or more data packets that include the action data structure, audio signals, or other data via the network 116 to the client device 128 or sensing device 142. For example, the data processing system 102 can provide the output signal from the data repository 118 or from the audio signal generator 110 to the client device 128. The data processing system 102 can also instruct, via data packet transmissions, the client device 128 or the sensing device 142 to perform the functions indicated in the action data structure. The output signal can be obtained, generated, transformed to or transmitted as one or more data packets (or other communications protocol) from the data processing system 102 (or other computing device) to the client device 128 or the sensing device 142.

The direct action API 112 of the data processing system 102 can generate, based on, for example, the request, action data structures. The action data structure can include data or instructions for the execution of a specified action to satisfy the request. The action data structure can be a JSON formatted data structure or an XML formatted data structure.

The action data structure can include information for completing the request. For example, the action data structure can be an XML (Extensible Markup Language) or JSON (JavaScript Object Notation) formatted data structure that includes attributes used in completing or otherwise fulfilling the request. The attributes can include a location of the vehicle 140, a location of the client device 128, an authorization level of a user associated with a client device 128, a vehicle identifier, an interface identifier, a vehicular state, or a request state. The request state can include one or more attributes that should be satisfied before the action is fulfilled. For example, the request "Ok, change the song" the request state may have the attribute that {requestor: authorized, passenger}. In this example, the requestor (e.g., the user that generated the input audio signal) should be explicitly authorized to change the songs or should be a passenger in the vehicle.

The direct action API 112 can retrieve a template 126 from the repository 118 to determine which fields or attributes to include in the action data structure. The direct action API 112 can determine necessary parameters and can package the information into an action data structure. The direct action API 112 can retrieve content from the repository 118 to obtain information for the attributes of the data structure.

The direct action API 112 can populate the fields with data from the input audio signal. The direct action API 112 can also populate the fields with data from the data provider 138, the client device 128, or the sensing device 142. The direct action API 112 can prompt a user for additional information when populating the fields. The templates 126 can be standardized for different types of actions, such as playing media files through the vehicle's head unit, responding to messages, and performing functions within the car. The action data structure can initially be generated by a direct action API 112 executed by a remote data processing system 102. The remote data processing system 102 can transmit the action data structure to the client device 128, which can add fields and attributes to the action data structure.

The direct action API 112 can obtain response data 124 (or parameters 120 or policies 122) from the data repository 118, as well as data received with end user consent from the client device 128 to determine location, time, user accounts, logistical or other information in order to reserve a car from the car share service. The response data 124 (or parameters 120 or policies 122) can be included in the action data structure. When the content included in the action data structure includes end user data that is used for authentication, the data can be passed through a hashing function before being stored in the data repository 118. Using the direct action API 112, the data processing system 102 can also communicate with the service provider computing device 160 to complete the conversion by, in this example, making the car share pick up reservation.

Figure 2:
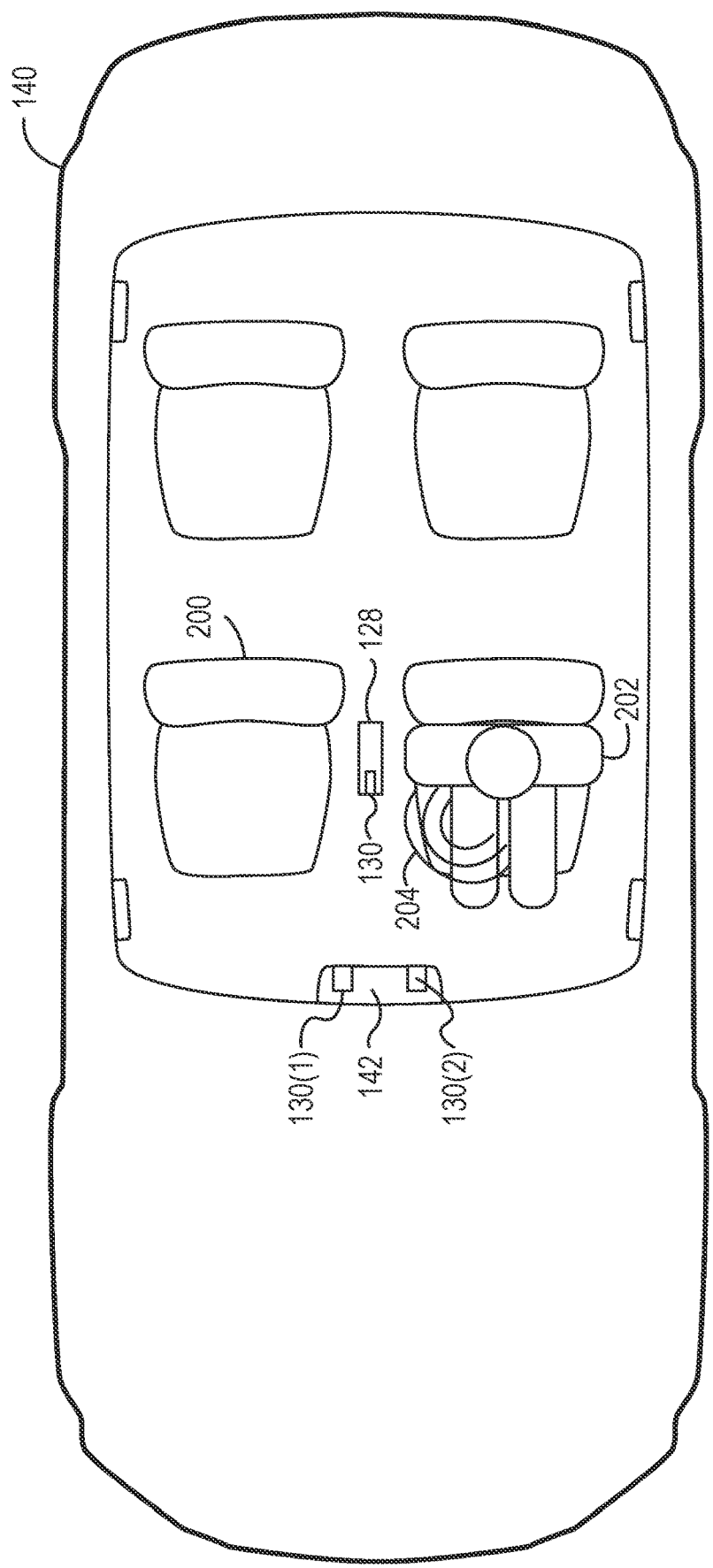
FIG. 2 illustrates a top view of the vehicle and illustrates the interior cabin of the vehicle illustrated in FIG. 1.

FIG. 2 illustrates a top view of the vehicle 140 and illustrates the interior cabin of the vehicle 140. The interior cabin of the vehicle 140 can include a plurality of seats 200. A user 202 can be seated in at least one of the seats 200. The user 202 can be associated with (e.g., own) a client device 128. The client device 128 can include a sensor 130. The interior of the vehicle 140 can include a sensing device 142. The sensing device 142 can include a first sensor 130(1) and a second sensor 130(2). Each of the sensors 130 can be microphones. The sensing device 142 can be a power adapter or charging device that converts power from the vehicle 140 into a power level that can be consumed by the client device 128. The client device 128 can establish a communication link with the sensing device 142 via a wireless connection, such as Bluetooth.

The user 202 can generate a request in the form of an input audio signal 204. The input audio signal 204 can be recorded or detected by the sensors 130 of the sensing device 142 and the sensor 130 of the client device 128. The sensing device's first sensor 130(1) can record the input audio signal 204 as a first instance of the input audio signal 204, the second sensor 130(2) can record the input audio signal 204 as a second instance of the input audio signal, and the client device's sensor 130 can record the input audio signal 204 as a third instance of the input audio signal 204. The client device 128 can be in a position where the quality of the input audio signal 204 received by the client device 128 is relatively low when compared to the sensing device 142. For example, the client device 128 can be in the user's pocket or in a center console of the vehicle 140. Given the relative position of each of the sensors 130 within the interior of the vehicle 140, each of the sensors 130 can record or detect a slightly different version of the input audio signal 204.

Also referring to FIG. 1, among others, the NLP component 106 component of the sensing device 142 can parse the instances of the input audio signal 204 detected by the first and second sensors 130. If the NLP component 106 detects or identifies the presence of an activation phrase (e.g., "Ok, device") or candidate activation phrase, the sensing device 142 can transmit the instance of the input audio signal 204 to the client device 128. The client device 128, which can have greater computational resources when compared to the sensing device 142, can process the instance of the input audio signal 204 with the client device's NLP component 106 to confirm the presence of the activation phrase in the input audio signal 204. If the client device 128 confirms the presence of the activation phrase, the client device 128 can transmit the input audio signal to the data processing system 102 for processing.

The sensing device 142 can transmit the first instance to the client device 128 at a first time point, such as at the time point when the sensing device 142 detects the presence of the activation phrase in the input audio signal 204. If the client device's NLP component 106 fails to determine that the activation phrase is in the input audio signal 204, the client device 128 can transmit a message to the sensing device 142 requesting that the sensing device 142 transmit the second instance of the input audio signal 204 recorded by the sensing device 142. The sensing device 142 can transmit the second instance of the input audio signal 204 to the client device 128 at a second time point. The second time point can be a point in time after the sensing device 142 completes the transmission of the first instance of the input audio signal 204 to the client device 128.

Once received, the client device's NLP component 106 can process the second instance of the input audio signal 204 for the presence of the activation phrase. The client device 128 can determine whether the input audio signal 204 includes the activation phrase based on the second instance of the input audio signal 204 or a combination of the first and second instances of the input audio signal 204.

The sensing device 142 can transmit the second instance of the input audio signal 204 to the client device 128 prior to receiving a request from the client device 128 for the second instance of the input audio signal 204. For example, the sensing device 142 can automatically begin to transmit the second instance of the input audio signal 204 to the client device 128 at a second time point upon the completion of the transmission of the first instance of the input audio signal 204 to the client device 128. When the sensing device 142 automatically begins to transmit the second instance of the input audio signal 204 to the client device 128, the client device 128 can transmit a termination message to the sensing device 142 if the client device 128 confirms the activation phrase is in the first instance of the input audio signal 204 because the second instance of the activation phrase is not required by the client device 128 to confirm the presence of the activation phrase in the input audio signal 204.

The client device 128 can also use the instance of the input audio signal 204 detected by the client device's sensor 130 to confirm whether the activation phrase is present in the input audio signal 204. The client device 128 can use the instance of the input audio signal 204 recorded by the client device 128 in combination with the first instance of the input audio signal 204 or the second instance of the input audio signal 204.

Figure 3:
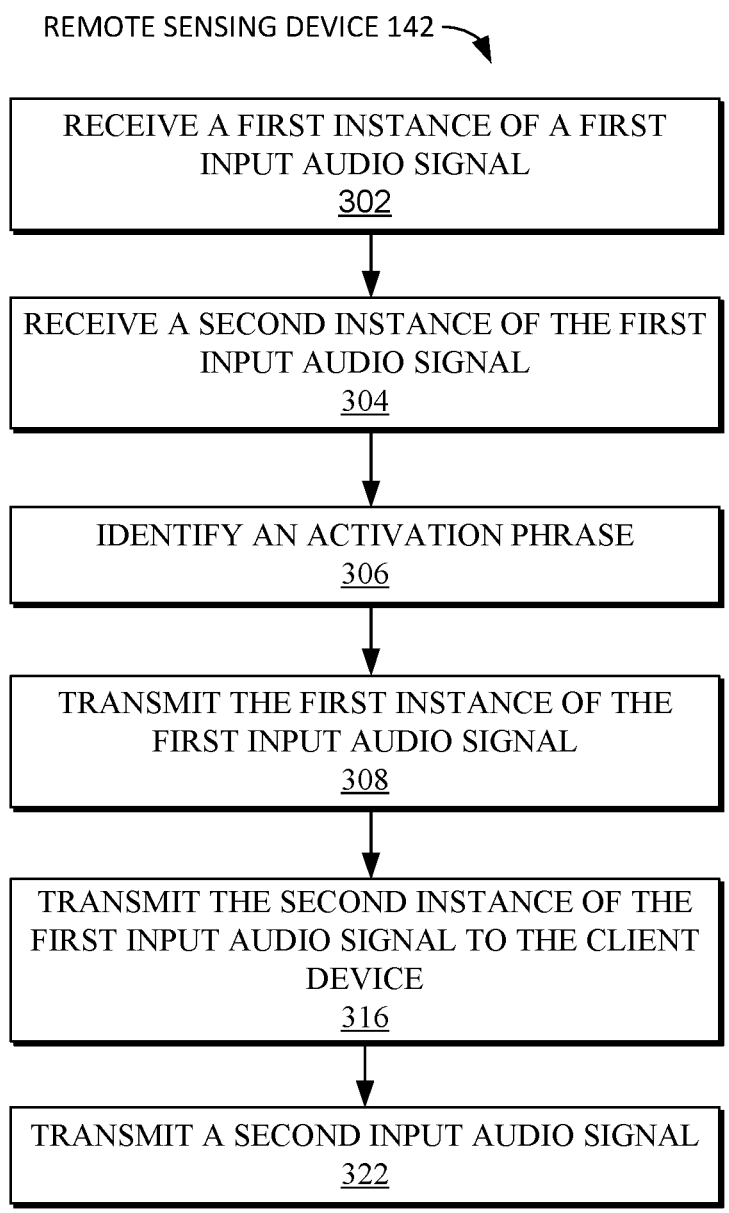
FIG. 3 illustrates a block diagram of an example method for detecting activation phrases in a networked system with limited bandwidth.

FIG. 3 illustrates a block diagram of an example method 300 for detecting activation phrases in a networked system with limited bandwidth. The steps illustrated on the left side of the block diagram can be performed by the sensing device 142 and the steps illustrated on the right side of the block diagram can be performed by the client device 128.

The method 300 can include receiving a first instance of an input audio signal (ACT 302) and receiving a second instance of the input audio signal (ACT 304). The method 300 can include identifying an activation phrase (ACT 306). The method 300 can include transmitting the first instance of the input audio signal (ACT 308). The method 300 can include receiving, by the client device, the first instance of the input audio signal (ACT 310). The method 300 can include parsing the first instance of the input audio signal (ACT 312). The method 300 can include determining whether the first instance of the input audio signal includes the activation phrase (ACT 314). The method 300 can include transmitting, by the sensing device, a second instance of the input audio signal (ACT 316) and receiving, by the client device, the second instance of the input audio signal (ACT 318). The method 300 can include parsing the second instance of the input audio signal (ACT 320). The method 300 can include transmitting, by the sensing device, a first instance of a second input audio signal (ACT 322). If at ACT 314 the client device identifies the activation phrase in the input audio signal, the method 300 can include terminating a transmission (ACT 324). The method 300 can include transmitting, by the client device, the first instance of the second input audio signal (ACT 326).

The method 300 can include receiving a first instance of an input audio signal (ACT 302) and receiving a second instance of the input audio signal (ACT 304). Also referring to FIGS. 1 and 2, the first and second instance of the input audio signal can be received by, for example, a first and second microphone (e.g., sensors 130) of the sensing device 142. The input audio signal can be an utterance made by a user. The first and second microphones can detect input audio signals when the volume of the input audio signals crosses a predetermined threshold.

The method 300 can include identifying an activation phrase (ACT 306). The sensing device 142 can include an NLP component 106. The sensing device 142 can have limited computational power and the NLP component 106 may be configured to only detect the presence of an activation phrase within an input audio signal. The threshold for accurately identifying activation phrases in incoming input audio signals can be low. For example, the sensing device's NLP component 106 can have a high false positive rate. The activation phrases detected by the sensing device 142 can be referred to as candidate activation phrases.

The method 300 can include transmitting the first instance of the input audio signal (ACT 308). The sensing device 142 can transmit the first instance of the input audio signal to the client device 128. The client device 128 can establish a Bluetooth connection between the sensing device 142 and the client device 128 over which the first instance of the input audio signal (and other data) is transmitted. The sensing device 142 can transmit the first instance of the input audio signal to the client device 128 at a first time point, such as upon detection of the activation phrase in the first instance of the input audio signal by the sensing device's NLP component 106.

The sensing device 142 can transmit the first instance of the input audio signal to the client device 128 for the client device 128 to confirm whether the activation phrase is in the input audio signal. The sensing device 142 can generate multiple copies of the first instance of the input audio signal. The different copies can be generated by applying different compression levels to the first instance of the input audio signal. For example, the sensing device 142 can generate a first copy of the first instance of the input audio signal that is highly compressed and has a relatively small file size but low audio quality and a second copy of the first instance of the input audio signal that is less compressed and has a relatively larger file size but higher audio quality. The sensing device 142 can transmit the highly compressed (smaller file size) copy of the first instance of the input audio signal to the client device 128 at the first time point. The sensing device 142 can transmit the second copy of the first instance of the input audio signal to the client device 128 at a second time point, such as in response to a request from the client device 128.

The method 300 can include receiving the first instance of the input audio signal (ACT 310). The client device 128 can receive the first instance of the input audio signal via the Bluetooth connection established between the sensing device 142 and the client device 128. The method 300 can include parsing the first instance of the input audio signal (ACT 312). The NLP component 106 of the client device 128 can parse the input audio signal and identify one or more candidate activation phrases. The candidate activation phrases can be phrases or terms that the NLP component 106 determines to have a likelihood above a predetermined threshold to be the activation phrase. The candidate activation phrase can be the activation phrase identified by the sensing device 142. For example, the sensing device 142 can send only a portion of the first instance of the input audio signal that is a clipped portion of the input audio signal that includes the candidate activation phrase with a predetermined amount of recording before and after the candidate activation phrase.

The method 300 can include identifying the activation phrase (ACT 314). The client device's NLP component 106 can parse the received instance of the input audio signal to determine or confirm whether the activation phrase is within the input audio signal. For example, the NLP component 106 can determine whether the candidate activation phrase is the activation phrase required to initiate a voice-based query or request. If the activation phrase is not within the input audio signal the method 300 can continue on to ACT 316 and if the NLP component 106 determines the activation phrase is within the input audio signal the method 300 can continue on to ACT 324.

The method 300 can include identifying the activation phrase within a third instance of the input audio signal. The third instance of the input audio signal can be recorded by the client device's microphone or other sensor 130. The ACT 314 of determining whether the input audio signal includes the activation phrase can include determining whether either of the first or third instance of the input audio signal includes the activation phrase. The client device's NLP component 106 can analyze the first and third instances of the input audio signal separately. For example, the NLP component 106 can make independent determinations of whether the instances of the input audio signal include the activation phrase. The NLP component 106 can determine the input audio signal includes the activation phrase if the NLP component 106 determines that either of the instances of the input audio signal is determined to include the activation phrase. The NLP component 106 can analyze the first and third instances of the input audio signal together. For example, the NLP component 106 generate a confidence score of whether each of the instances of the input audio signal includes the activation phrase and make the determination of whether the input audio signal includes the activation phrase based on a combination or average of the confidences scores associated with each of the instances of the input audio signal.

The method 300 can include transmitting, by the sensing device, a second instance of the input audio signal (ACT 316). The sensing device 142 can transmit the second instance of the input audio signal to the client device 128 over the Bluetooth connection established between the sensing device 142 and the client device 128. The second instance of the input audio signal can be an instance of the input audio signal that is detected or recorded at the sensing device 142 by a microphone or other sensor 130 that is different than the other microphone or sensor 130 that detected or recorded the first instance of the input audio signal. The sensing device 142 can transmit the second instance of the input audio signal to the sensing device 142 at a second time point. The second time point can be after the first time point. The second time point can be upon the completion of the transmission of the first instance of the input audio signal to the client device 128 (e.g., after the completion of the ACT 308). For example, the sensing device 142 can automatically transmit the second instance of the input audio signal to the client device 128 upon completing the transmission of the first instance of the input audio signal to the client device 128.

The sensing device 142 can transmit the second instance of the input audio signal to the client device 128 in response to a request from the client device 128. For example, at ACT 314, when the client device 128 determines that the activation phrase is not within (or cannot be detected within) the first instance of the input audio signal, the client device 128 can generate and transmit a request to the sensing device 142 for the second instance of the input audio signal. The client device 128 can transmit the request for the second instance of the input audio signal over the Bluetooth network established between the sensing device 142 and the client device 128.

When the sensing device 142 includes only a single microphone, the second instance of the input audio signal can be a copy of the first instance of the input audio signal but with a higher audio quality. For example, the copy transmitted at ACT 318 can be less compressed when compared to the first instance of the input audio signal transmitted at ACT 308.

The method 300 can include parsing the second instance of input audio signal (ACT 320). The client device's NLP component 106 can parse the second instance of the input audio signal to identify candidate activation phrases in the second instance of the input audio signal. If the client device's NLP component 106 determines that one of the candidate activation phrases is the predetermine activation phrase, the client device 128 can transmit a second input audio signal to the data processing system 102. The second input audio signal can be detected or recorded by any of the sensors 130 of the sensing device 142 or the client device 128. The second input audio signal can be a continuation of the first input audio signal. For example, the second input audio signal can be or can include the user utterances immediately after the activation phrase.

The method 300 can include transmitting, by the sensing device, a first instance of a second input audio signal (ACT 322). The first instance of the second input audio signal can be the input audio signal that the client device 128 receives and transmits to the data processing system 102 based on the detection of the activation phrase in the first or second instance of the first input audio signal.

The second input audio signal can be an input audio signal detected or recorded by one of the sensors 130 after the detection of the first input audio signal. A portion of the second input audio signal can overlap a portion of the first input audio signal. The first and second input audio signals can be generated from a single input audio signal. The first input audio signal can include the activation phrase and the second input audio signal can include a request. For example, the input audio signal can be "Ok, skip to the next song." In this example the first input audio signal can include at least the activation phrase "Ok" and the second input audio signal can include at least the request "skip to the next song." To save power and bandwidth, the sensing device 142 can send only the portion of the input audio signal including the activation phrase (e.g., the first input audio signal) to the client device 128. The sensing device 142 may not send the portion of the input audio signal including the request (e.g., the second input audio signal) until the sensing device 142 receives a confirmation message from the client device at the first input audio signal includes the activation phrase. In some implementations, the sensing device 142 can first send one or more instances of the first input audio signal that might include the activation phrase and then automatically begin to transmit the second input audio signal to the client device 128 once the transmission of the first input audio signal to the client device 128 is complete.

Returning to the identification step at ACT 314, if the client device 128 identifies the activation phrase in the first instance of the input audio signal, the client device 128 can terminate transmissions between the sensing device 142 and the client device 128. The termination of the transmissions between the sensing device 142 and the client device 128 can be optional. As described above, the sensing device 142 can automatically transmit the second instance of the input audio signal to the client device 128 upon the completion of the transmission of the first instance of the input audio signal to the client device 128. The client device 128 can generate and transmit a termination message to the sensing device 142 that can cause the sensing device 142 to stop the transmission of the second instance of the input audio signal to the client device 128. Terminating the transmission of the second instance of the input audio signal to the client device 128 can include the client device 128 stopping receipt of the second instance of the input audio signal. For example, the sensing device 142 can continue to transmit the second instance of the second input audio signal, but the client device 128 can decline to receive the second instance of the input audio signal or perform no further processing on the second instance of the input audio signal once the second instance of the input audio signal is received. Performing no further processing can include not processing the second instance of the input audio signal with the client device's NLP component 106.

The method 300 can include transmitting the first instance of the second input audio signal (ACT 326). The method 300 can include transmitting, by the client device 128, the first instance of the second input audio signal to the data processing system 102. The client device 128 can receive the first instance of the second input audio signal at ACT 322. The client device 128 can transmit the first instance of the second input audio signal to the data processing system 102 responsive to detecting or confirming the presence of the activation phrase in at least one of the first or second instances of the input audio signal. The second input audio signal can include a request that can be parsed by the data processing system's NLP component 106 and fulfilled (at least partially) by the data processing system 102.

Figure 4:
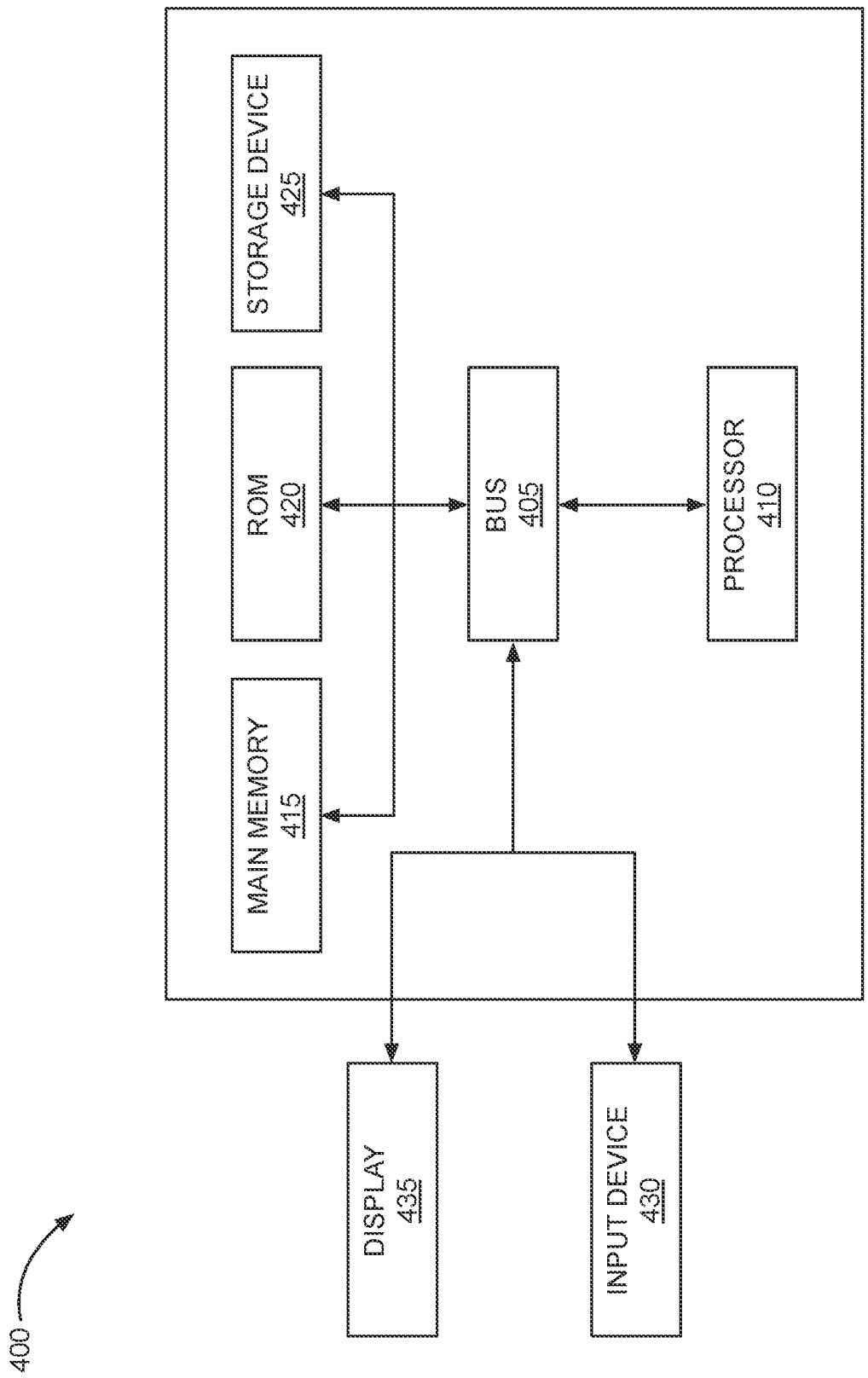
FIG. 4 is a block diagram of an example computer system.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128 or other component of FIG. 1, for example.

The processes, systems, and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs (e.g., one or more circuits of computer program instructions) encoded on one or more computer storage media for execution by, or to control the operation of, data processing apparatuses. Alternatively, or in addition, the program instructions can be encoded on an artificially generated propagated signal (e.g., a machine-generated electrical, optical, or electromagnetic signal that is generated to encode information for transmission to suitable receiver apparatus for execution by a data processing apparatus). A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, for example, an FPGA (field programmable gate array) or an ASIC (application specific integrated circuit). Devices suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

The subject matter described herein can be implemented in a computing system that includes a back end component (e.g., as a data server), or that includes a middleware component (e.g., an application server), or that includes a front end component (e.g., a client computer having a graphical user interface) or a web browser through which a user can interact with an implementation of the subject matter described in this specification, or a combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 116). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 128 or the sensing device 142.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to transmit data in a voice-activated network, comprising:
   a first microphone of a sensing device, to receive a first instance of a first input audio signal;
   a second microphone of the sensing device, to receive a second instance of the first input audio signal;
   a natural language processor component executed by the sensing device, to parse the first instance of the first input audio signal to identify an activation phrase;
   an interface, of the sensing device, to transmit, at a first time point, the first instance of the first input audio signal to a client device based on identification of the activation phrase in the first instance of the first input audio signal;
   upon completion of the transmission of the first instance of the first input signal to the client, the interface, of the sensing device, to transmit, the second instance of the first input audio signal to the client device; and
   the interface, of the sensing device, to transmit a second input audio signal to the client device based on a confirmation message from the client device of an identification of the activation phrase in the second instance of the first input audio signal.

2. The system of claim 1, comprising the natural language processor component to:
   identify an instance of a second input audio signal acquired via at least one of the first microphone or the second microphone of the sensing device;
   parse the instance of the second input audio signal to identify a second candidate activation phrase;
   determine that the second candidate activation phrase contains a predetermined activation phrase; and
   the interface of the client device to transmit, to the data processing system, responsive to the determination that the second candidate activation phrase contains the predetermined activation phrase.

3. The system of claim 1, comprising the natural language processor component to:
   identify an instance of a second input audio signal acquired via a microphone of a second sensing device different from the sensing device;
   parse the instance of the second input audio signal to identify a second candidate activation phrase; and
   determine that the second candidate activation phrase contains at least one of a plurality of predetermined activation phrases; and
   the interface of the client device to transmit, to the data processing system, responsive to the determination that the second candidate activation phrase contains at least one of the plurality of predetermined activation phrases.

4. The system of claim 1, the interface of the client device to:
   receive, from the sensing device, an instance of a second input audio signal determined by the sensing device to contain at least one of a plurality of predetermined activation phrases; and
   transmit, to the data processing system, the instance of the second input audio signal to cause the data processing system to generate a data packet based on the input audio signal from the sensing device and the instance of the second input audio signal.

5. The system of claim 1, comprising the interface of the client device to:
   transmit, to the data processing system, the input audio signal to cause the data processing system to identify a request from at least one of the first instance of the first input audio signal or the second instance of the first input audio signal and to select an output audio signal to include in a data packet based on the request; and
   receive, from the data processing system, the data packet including the output audio signal generated based on the request to present via at least one of the sensing device or the client device.

6. The system of claim 1, comprising the interface of the client device to:
   transmit, to the data processing system, the input audio signal to cause the data processing system to use the input audio signal to identify a text output to include in a data packet; and
   receive, from the data processing system, the data packet including the text output to present on a display communicatively coupled with the client device.

7. The system of claim 1, comprising the natural language processor component to determine that a second candidate activation phrase contains at least one of a plurality of predetermined activation phrases, the second candidate activation phrase identified from an instance of a second input audio signal acquired via at least one of the first microphone or the second microphone; and the interface of the client device to transmit a request for at least one instance of a third input audio signal responsive to the determination that the second candidate activation phrase contains at least one of the plurality of predetermined activation phrases.

8. The system of claim 1, comprising the interface of the client device to transmit, to the sensing device, responsive to the determination that a second candidate activation phrase contains at least one of a plurality of predetermined activation phrases, a message to cause the sensing device to restrict provision of a third instance of the first input audio signal to the client device.

9. The system of claim 1, comprising the natural language processor component to identify the second instance of the first input audio signal having a compression rate different from a compression rate of the first instance of the first input audio signal.

10. The system of claim 1, comprising the interface of the client device to establish, between the client device and the sensing device, a connection over which to identify the first instance of the first input audio signal and the second instance of the first input audio signal.

11. A method, comprising:
receiving, using a first microphone of a device, a first instance of a first input audio signal;
receiving, using a second microphone of the device, a second instance of the first input audio signal;
parsing, by the device, the first instance of the first input audio signal to identify an activation phrase;
transmitting, by the device, at a first time point, the first instance of the first input audio signal based on identification of the activation phrase in the first instance of the first input audio signal;
upon completion of the transmission of the first instance of the first input signal to a client, transmitting, by the device, the second instance of the first input audio signal; and
transmitting, by the device to a data processing system, a second audio signal associated with at least one of the first instance of the first input audio signal and the second instance of the first input audio signal.

12. The method of claim 11, further comprising:
identifying an instance of a second input audio signal acquired via at least one of the first microphone or the second microphone;
parsing the instance of the second input audio signal to identify a second candidate activation phrase;
determining that the second candidate activation phrase contains at least one of a plurality of predetermined activation phrases; and
transmitting, by the device to the data processing system, responsive to the determination that the second candidate activation phrase contains at least one of the plurality of predetermined activation phrases.

13. The method of claim 11, further comprising:
identifying an instance of a second input audio signal acquired via a microphone of a sensing device different from the device;
parsing the instance of the second input audio signal to identify a second candidate activation phrase; and
determining that the second candidate activation phrase contains a predetermined activation phrase; and transmitting, by the device to the data processing system, responsive to the determination that the second candidate activation phrase contains the predetermined activation phrase.

14. The method of claim 11, further comprising:
transmitting, by the device to the data processing system, the input audio signal to cause the data processing system to use the input audio signal to identify a text output to include in a data packet; and
receiving, by the device from the data processing system, the data packet including the text output to present on a display communicatively coupled with the client device.

15. The method of claim 11, further comprising:
identifying the second instance of the first input audio signal having a compression rate different from a compression rate of the first instance of the first input audio signal.

16. A method of detecting activation phrases in remote devices, comprising:
determining, by a client device, a first candidate activation phrase identified from a first instance of a first input audio signal acquired via a first microphone of a sensing device;
identifying, by the client device, a second instance of the first input audio signal acquired via a second microphone of the sensing device, wherein the second instance of the first input audio signal is received after transmission of the first instance of the first input signal to the client;
parsing, by the client device, the second instance of the first input audio signal to identify a second candidate activation phrase; and
determining, by the client device, that the second candidate activation phrase contains at least one of a plurality of predetermined activation phrases; and
transmitting, by an interface of the client device, to a data processing system, responsive to determining that the second candidate activation phrase contains at least one of the plurality of predetermined activation phrases, an input audio signal associated with at least one of the first instance or the second instance of the first input audio signal to cause the data processing system to generate a data packet including an output based on the input audio signal; and
receiving, by the interface of the client device, from the data processing system, the data packet including the output to present via at least one of the client device or the sensing device.

17. The method of claim 16, comprising:
receiving, by the interface of the client device from the sensing device, an instance of a second input audio signal determined by the sensing device to contain at least one of the plurality of predetermined activation phrases; and
transmitting, by the interface of the client device, to the data processing system, the instance of the second input audio signal to cause the data processing system to generate the data packet based on the input audio signal from the sensing device and the instance of the second input audio signal.

18. The method of claim 16, comprising
transmitting, by the interface of the client device, to the data processing system, the input audio signal to cause the data processing system to identify a request from at least one of the first instance of the first input audio signal or the second instance of the first input audio signal and to select an output audio signal to include in the data packet based on the request; and receiving, by the interface of the client device, from the data processing system, the data packet including the output audio signal generated based on the request to present via at least one of the sensing device or the client device.

19. The method of claim 16, comprising transmitting, by the interface of the client device, to the sensing device, responsive to determining that the second candidate activation phrase contains at least one of the plurality of predetermined activation phrases, a message to cause the sensing device to restrict provision of a third instance of the first input audio signal to the client device.

20. The method of claim 16, comprising identifying, by the client device, the second instance of the first input audio signal having a compression rate different from a compression rate of the first instance of the first input audio signal.

21. The system of claim 1, wherein the second input audio signal is user utterances immediately after the activation phrase.

* * * * *